3,795,584
PROCESS FOR PRODUCING HIGH PURITY MALTOSE

Masakazu Mitsuhashi and Kazuo Masuda, Okayama, Makoto Shiosaka, Fukuoka, Mamoru Hirao and Kaname Sugimoto, Okayama, Yasuyuki Yokobayashi, Osaka, and Shokichi Yuen and Mikihiko Yoshida, Okayama, Japan, assignors to Hayashibara Co., Okayama, Japan
No Drawing. Continuation of abandoned application Ser. No. 735,988, June 11, 1968. This application Sept. 3, 1971, Ser. No. 177,829
Claims priority, application Japan, June 30, 1967, 42/41,581
Int. Cl. C12d 13/02
U.S. Cl. 195—31 R
2 Claims

ABSTRACT OF THE DISCLOSURE

According to the present invention, starch is first liquified with acid or enzyme, the pH of the resulting liquified starch is adjusted to about 6, the liquified starch is saccharified by the use of beta-amylase and alpha-1, 6-gluco-sidase or in addition alpha-amylase during the saccharifying step to produce a maltose with purity of about 99%.

This is a continuation of application Ser. No. 735,988, filed June 11, 1968, now abandoned.

This invention relates to a process for producing a high purity maltose solution by liquifying starch and then saccharifying it using beta-amylase and alpha-1, 6-glucosidase in the presence or absence of an amylolytic enzyme.

Heretofore, for the production of maltose, it has been customary to liquify starch by the use, for example, of beta-amylase and then add malt to the liquid thereby to accomplish saccharification by the action of the malt amylase (i.e., a mixture of alpha- and beta-amylases). By such process for producing maltose by malt, the saccharified solution obtained would contain at most about 70% of pure maltose even if the amount of beta-amylase was increased by the use of malt containing a fairly large amount of beta-amylase.

Refining of such saccharified solution is extremely difficult and purification by recrystallization cannot be resorted to, and therefore it is a usual practice to refine the product by way of fractional precipitation with alcohol or recrystallization of derivative. However, even the commercially available maltose claimed to be of special grade cannot be refined to a purity above about 93%, and contains dextrins, malt-triose, glucose and other impurities.

Accordingly, it is an object of the present invention to provide a high purity maltose. A further object of the present invention is to provide a novel process for producing a high purity maltose by the use of beta-amylase and alpha-1, 6-glucosidase or in addition alpha-amylase during the saccharifying step. A still further object of the present invention is to produce a maltose in a simple and efficient manner in high yield with a high degree of purity. The present invention will now be more fully described hereunder.

It has now been found that, in the course of saccharification with beta-amylase, the addition of alpha-1, 6-glucosidase which is an enzyme capable of specifically acting in the cleavage of alpha-1, 6-glucosidic linkage in the amylopectin of starch produces a high purity maltose solution.

By way of example, 10% sweet potato starch slurry was liquified to D.E. (dextrose equivalent) 2.7% with alpha-amylase and the resultant liquified starch was (A) saccharified with the addition of 25 units of beta-amylase per gram of the starch at 45° C. for 16 hours, and (B) the same liquified test specimen was likewise saccharified with the addition of 25 units of beta-amylase and 10 units of pullulanase (alpha-1, 6-glucosidase) per gram of the starch. The compositions of the saccharified solutions thus obtained were as shown in Table 1. It was found that when beta-amylase alone was used the maltose content of the saccharified solution (A) was 69.6%, while the maltose content of the solution (B) obtained by combined use of beta-amylase and pullulanase exceeded 90%.

TABLE I

| | Maltose (percent) | Glucose (percent) | Malt-triose (percent) | Dextrin (percent) |
|---|---|---|---|---|
| A | 69.6 | 1.1 | 3.5 | 25.7 |
| B | 90.4 | 0.4 | 1.3 | 7.9 |

Pullulanase is an alpha-1, 6-glucosicase (isomylase) capable of specifically cleaving the alpha-1, 6-glucosidic links, and which is obtained by culturing the bacterium of Aerobacter aerogenes. (Refer to the specification of Japanese patent application No. 34,468/1967.)

The Japanese method of determining the alpha-1, 6-glucosidase activity is as follows:

A reaction solution consisting of:

|  | Ml. |
|---|---|
| Enzyme solution | 1 |
| 1% soluble glutinous rice starch solution | 5 |
| 0.5 M acetic acid buffer solution, pH 6 | 1 | was reacted at 49° C. for 30 minutes. 0.5 ml. of the resultant solution and 0.5 ml. of 0.01 M iodine solution were added to 15 ml. of water. 15 minutes later, the absorbance at a wavelength of 610 m$\mu$ was determined, and the enzymatic activity for changing the absorbence by 0.1 was deemed as 10 units.

The method of determining beta-amylase activity is as follows:

A mixed solution consisting of:

|  | Ml. |
|---|---|
| 1% soluble starch solution | 5 |
| M/10 acetic acid buffer solution | 4 |
| Enzyme solution | 1 | was reacted at 40° C. for 30 minutes. The reducing sugar thus obtained was estimated as glucose. When it contained 10 mg. maltose it was deemed as one unit.

As stated above, the addition of alpha-1, 6-glucosidase in the saccharification of liquified starch with beta-amylase for the production of maltose permits the cleavage of the alpha-1, 6-glycosidic linkage at the branching point of amylopectin of the starch to the form of a straight-chain structure like amylose, which tends to be easily decomposed by beta-amylase. It thus appears that the saccharification efficiency of the liquified starch with beta-amylase is improved without the possibility of a dextrin having alpha-1, 6-glucosidic linkage and known as alpha, beta-limited dextrin being left behind and on the other hand, the production of such by-products as malttriose and glucose is inhibited using low D.E. liquified starch. Presumably these factors combine to give a high purity maltose solution.

The term α-1,6-glucosidase is generic and would include both pullulanase produced by the bacteria of the genus Aerobacter as above-mentioned, and also isoamylase yielded by the bacteria of the genus Pseudomonas, for example the variety obtained by culturing *Pseudomonas amyloderamosa* (ATCC No. 21,262) as disclosed in the specification of Japanese patent application No. 34,867/1967. Experiments have proven that the latter enzyme combined with beta-amylase can give a maltose solution as pure as that produced by the combination of pullulanase and beta-amylase.

As will be apparent from the foregoing description, it is possible in the process of producing maltose through saccharification of liquified starch with beta-amylase to bring a sharp increase in the maltose content of the saccharified solution by the addition of alpha-1,6-glucosidase. And now it has been found the further addition of an amylolytic enzyme (alpha-amylase) in the course of saccharification facilitates the purification of the saccharified solution.

When a saccharified solution obtained by the saccharification of liquified starch with beta-amylase and alpha - 1,6 - glucosidase is purified in the usual manner, extremely small amounts of high-molecular dextrins remaining therein render the purification with an ion exchange resin highly difficult and produce the possibility of the product becoming turbid. Here the addition of alpha-amylase greatly facilitates the purification of the saccharified solution with an ion exchange resin. By way of exemplification, a solution (C) saccharified by the combined use of beta-amylase and pullulanase (saccharified solution concentration 39.4%) and a solution (D) saccharified by the combined use of three converting agents, i.e., beta-amylase, pullulanase and alpha-amylase (saccharified solution concentration 39.4%) were compared with respect to their abilities to be treated with an ion exchange resin. The results were as shown in Table 2. As will be seen, (C) is almost incapable of being purified with the ion exchange resin, while (D) can be readily purified.

TABLE 2

| | Strong acid-medium-base two-bed pretreatment | Strong acid-strong base mixed-bed treatment |
|---|---|---|
| C | 8 times by volume of soln. on basis of acid resin volume passed, pH 5.2 Sp. resis. 5×10⁴ cm. | 2 times by volume of soln. on basis of resin volume passed, pH 3.7 Sp. resis. 8×10³ cm. |
| D | 20 times by volume of soln. on basis of acid resin volume passed, pH 8.0 Sp. resis. 1×10⁵ cm. | 40 times by volume of soln. on basis of resin volume passed, pH 5.0 Sp. resis. 1×10³ cm. |

Further study by the present inventors have led to a finding that the use of a mixture of different varieties of alpha - 1,6 - glucosidase instead of only one in combination with beta-amylase for the saccharification of liquified starch permits an increased output of maltose as shown in Table 3.

The increased production of maltose by the combined use of different varieties of alpha - 1,6 - glucosidase as can be seen from Table 3 is presumably attributed to different cleavage abilities of pullulanase and the isoamylase produced by the Pseudomonas bacteria against different alpha-1,6 linkages.

The present invention is based on the above findings and concerns a process for producing high purity maltose solutions by saccharifying liquified starch using beta-amylase and one or more different varieties of alpha-1,6-glucosidase and also a process of saccharifying liquified starch using beta-amylase and one or more different varieties of alpha-1,6-glucosidase and also alpha-amylase.

The material to be used in the saccharification process may be starch slurry liquified by alpha-amylase or starch slurry gelatinized and liquified by heating.

Experimentarily, slurries each containing 2% of different starches were dispersed and gelatinized in boiling water, subjected to a temperature of 130° C. and pressure for 5 minutes. Then, 20 units of pullulanase, 100 units of beta-amylase, and 5 units of alpha-amylase were added for each gram of the starch present, and the mixture was saccharified at 45° C. for 16 hours. Results as given in Table 4 were obtained. Here it is to be noted that, while the starch slurry is usually used with a starch concentration of about 2%, the concentration may be increased up to 5% in the case of a waxy corn starch.

TABLE 4

| Starch | Degree of amylolysis D.E. (percent) | Sugar composition (percent) | | | |
|---|---|---|---|---|---|
| | | Glucose | Maltose | Malttriose | Dextrin |
| Potato starch | 59.55 | 1.1 | 91.8 | 4.0 | 3.1 |
| Corn starch | 59.97 | 1.7 | 92.3 | 4.3 | 1.7 |
| Waxy corn starch | 63.38 | 2.2 | 92.6 | 3.3 | 1.9 |

NOTE.—The alpha-amylase activity was determined in conformity to the procedure described in II-12-1a on page 88 of "Analysis Methods of Starch Sugar Industry" edited by the Society for Technical Research of Starch Sugars.

Next, starch slurries of different concentrations prepared from potato starch were liquified using alpha-amylase at elevated temperatures in the usual manner and treated with pressure and at 130° C. for 5 minutes (D.E. 10%). Then, after the addition of 25 units of pullulanase and 7 units of beta-amylase per gram of starch, each test mixture was saccharified at pH 6.0 by heating at 45° C. for 6 hours. The results are shown in Table 5. In such liquifying process, a suitable concentration of the starch slurry to be liquified is about 10%.

TABLE 5

| Starch conc. (percent) | D.E. (percent) | Sugar composition (percent) | | | |
|---|---|---|---|---|---|
| | | Glucose | Maltose | Malttriose | Dextrin |
| 10 | 56.62 | 0.2 | 77.7 | 8.6 | 13.7 |
| 20 | 53.7 | 0.3 | 75.4 | 8.6 | 15.4 |

Further, regarding the relationship between the degree of liquifaction of starch and the maltose production, it will be seen from Table 6 that the greater the liquifaction degree the higher the D.E., but the lower the D.E. the more the maltose output.

TABLE 3

| Enzyme added | | Sugar composition (percent) | | | |
|---|---|---|---|---|---|
| | | Glucose | Maltose | Malt-triose | Dextrin |
| E | {Pullulanase, Beta-amylase} | 0.6 | 93.0 | 5.1 | 1.9 |
| F | {Pullulanase, Isoamylase of Pseudomonas beta-amylase} | 0.8 | 95.1 | 4.0 | 0.9 |

NOTE.—In each experiment a gelatinized solution containing 2% sweet potato starch with the same amount of enzyme (the amount of pullulanase used in E being equal to the combined amount of pullulanase and isoamylase produced by the bacteria of the genus Pseudomonas) at 45° C. for 64 hours. The pH during conversion was 6.0 for E and 5.5 for F.

TABLE 6

| Star liq deg. (percent) | Final D.E. (percent) | Sugar composition (percent) | | | |
|---|---|---|---|---|---|
| | | Glucose | Maltose | Malttriose | Dextrin |
| 3.8 | 53.69 | 0.6 | 82.0 | 6.7 | 10.7 |
| 11.8 | 54.86 | 0.9 | 75.0 | 13.8 | 10.3 |
| 18.8 | 55.16 | 1.1 | 68.5 | 21.0 | 9.4 |

NOTE.—For the saccharification, the same procedure as employed to give the results of Table 5 was followed except that 22 units of pullulanase and 15 units of beta-amylase were used for each gram of the starch.

The amount of pullulanase to be added is preferably about 20 units per gram of starch, as will be understood from Table 7. Excessive addition will have an undesirable effect upon the saccharifying action of beta-amylase.

TABLE 7

| Amount of pullulanase added, units | Amount of beta-amylase added, units. | Final D.E. (percent) | Sugar composition (percent) | | | |
|---|---|---|---|---|---|---|
| | | | Glucose | Maltose | Malttriose | Dextrin |
| 10 | 30 | 55.8 | 0.8 | 85.4 | 6.3 | 7.5 |
| 20 | 30 | 57.5 | 0.9 | 87.7 | 6.3 | 5.1 |
| 200 | 30 | 58.9 | 1.0 | 92.0 | 13.5 | |
| 0 | 30 | 58.9 | 1.1 | 69.6 | 3.5 | 25.7 |

NOTE.—A starch slurry with a concentration of 10% of sweet potato starch was used. The liquification degree was 2.5%, and the saccharification was effected with pH 6.0 at 45° C. for 36 hours.

Although the production of maltose increases proportionally with the amount of beta-amylase added, it is appropriate from the industrial standpoint to use from 30 to 60 units of the amylase per gram of starch. Saccharification time required is about 46 hours.

When 20 units of pullulanase and 5 units of alpha-amylase were added per gram of starch and otherwise the same procedure as for Table 5 was followed, the saccharification of the resulting liquified starch specimens gave the results as shown in Table 8.

TABLE 8

| Amount of beta-amylase per gram starch | Saccharification time (hr.) | Final D.E. (percent) | Sugar composition (percent) | | | |
|---|---|---|---|---|---|---|
| | | | Glucose | Maltose | Malttriose | Dextrin |
| 20 | 5 | 53.7 | 0.5 | 75.0 | 11.0 | 13.5 |
| 20 | 12 | 57.6 | 2.2 | 78.9 | 12.2 | 6.7 |
| 20 | 24 | 59.51 | 1.6 | 83.3 | 11.8 | 3.3 |
| 20 | 46 | 60.0 | 1.4 | 82.5 | 13.1 | 3.0 |
| 60 | 6 | 55.5 | 1.1 | 79.6 | 9.0 | 10.3 |
| 60 | 12 | 59.5 | 2.2 | 82.8 | 9.0 | 6.0 |
| 60 | 24 | 61.3 | 2.0 | 87.1 | 8.4 | 2.5 |
| 60 | 46 | 61.9 | 2.2 | 88.3 | 7.0 | 2.5 |

The amount of alpha-amylase to be added during the course of saccharification may be limited because it is simply intended for the decomposition of remaining dextrin. Usually about 5 units of alpha-amylase per gram of starch is sufficient for the purpose. Excessive addition may deteriorate the purity of maltose. As for the timing for the addition, the data shown in Table 9 indicate that the addition in the intermediate period of saccharification gives best results. An adequate effect would not be expected if the addition is too late.

TABLE 9

| | Final D.E. (percent) | Sugar composition (percent) | | | |
|---|---|---|---|---|---|
| | | Glucose | Maltose | Malttriose | Dextrin |
| Control | 62.82 | 1.4 | 87.3 | 9.1 | 2.2 |
| Alpha-amylase added 6 hrs. later | 62.80 | 2.2 | 87.3 | 7.4 | 3.1 |
| Alpha-amylase added 12 hrs. later | 62.80 | 1.3 | 88.2 | 7.1 | 3.4 |
| Alpha-amylase added 24 hrs. later | 62.90 | 1.4 | 89.8 | 5.9 | 2.9 |

Saccharification rate and the purity of maltose to be obtained vary with the type of starch material. Waxy corn starch gives the best results, followed by corn starch, potato starch, and soluble starch, in the order mentioned.

EXAMPLE 1

One hundred grams of corn starch was added to 4500 ml. of boiling water and gelatinized and dispersed therein. The aqueous dispersion was then subjected to a pressure at 130° C. for 5 minutes, cooled down to 45° C., and the pH was adjusted to 6.0. After the addition of 20 units of pullulanase-salting-out enzyme (described in the specification of Japanese patent application No. 34,468/1967) and 100 units of beta-amylase per gram of the starch, the mixture was saccharified at 45° C. for 48 hours. The saccharified solution was then heated, filtered, concentrated and was purified by decoloration in the usual manner. Upon concentration to a water content of 15%, it gave colorless crystals. Analysis on dry basis showed that the product was high purity maltose consisting of 93.0% maltose, 1.5% glucose, 4.0% malt-tiose, and 1.5% others.

EXAMPLE 2

After 100 g. of waxy corn satrch was gelatinized in the same manner as described in Example 1, 20 units of pullulanase and 100 units of beta-amylase were added per gram of the starch. The mixture was saccharified at 45° C. for 10 hours, and then 5 units of alpha-amylase was added per gram of the starch. Saccharification was repeated for a further period of 45 hours. The resultant solution was boiled, decolored, and concentrated. Upon further purification with Amberlite IR 120, IRA 68, and IRA 411 (all trademarks of ion exchange resins made by Rohm and Haas Co.) followed by concentration, it became completely solid with a water content of 13%. Analysis showed that the product contained 93.5% of maltose on a dry basis. In the form of a 70% solution, it was crystallized and micro-crystals were formed. Fractionation of the crystals yielded maltose with a purity of 96 to 97%.

EXAMPLE 3

One hundred grams of waxy corn starch was gelatinized in the same manner as in Example 1. Next, 20 units of pullulanase, 40 units of alpha-1,6-glucosidase obtained from a certain variety of bacteria of the genus Pseudomonas (as described in the specification of Japanese patent application No. 34,867/1967), and 25 units of beta-amylase were added per gram of the starch. The pH of the mixture was adjusted to 5.5, and the mixture was saccharified at 45° C. for 46 hours, boiled, and then purified with active carbon in the usual manner and concentrated. The syrup thus obtained which had a water content of 13% immediately crystallized. Upon analysis it proved to have a maltose content of 95% (on dry basis), the anhydride yield being 95%.

EXAMPLE 4

With 500 grams of potato starch, a slurry containing about 30% starch was prepared. After the addition of 0.2% Neospitase (trademark of an alpha-amylase made by Nagase Sangyo Co.), the slurry with pH 6 was liquified at 88° C. The operation was discontinued upon reaching D.E. of 2.7. Hot water was added to form a solution having a solid content of 10%. Then, 25 units of pullulanase and 50 units of beta-amylase were added per gram of the starch. After 15 hours of saccharification with pH 6 at 45° C., 5 units of Neospitase was again added per gram of the starch. Saccharification was thus accomplished for a total period of 48 hours. The resultant was heated, filtered, and purified with active carbon and ion exchange resins in the usual manner. This highly pure maltose solution was concentrated to a water content of 15% and crystallized. The yield of solid matter was 92% on the basis of solid materials, and the maltose content was 94% on dry basis.

It will be obvious to those skilled in the art that various changes may be made without departing from the scope of the invention and the invention is not to be considered limited to what is described in the specification.

What is claimed is:

1. A process for producing high purity maltose which comprises liquefying a starch slurry with a concentration of less than 15% by gelatination with heat or by virtue of an amylolytic enzyme, and thereafter saccharifying the liquefied starch with D.E. of less than 3% by the addition of β-amylase, α-1,6-glucosidase produced by bacteria of *Pseudomonas amyloderamosa* ATCC 21262 and pullulanase.

2. A process for producing high purity maltose in accordance with claim 1 wherein 30 units of β-amylase, 20 units of pullulanase and 40 units of said enzyme from *Pseudomonas amyloderamosa* are used per gram of starch.

References Cited

UNITED STATES PATENTS 3,565,765  2/1971  Heady et al. .......... 195—31 R

OTHER REFERENCES

Kjolberg et al., Biochem. J., vol. 86, pp. 258–62, 1963.

Lee et al., Biochem. Biophys., Arch., vol. 116, pp.162–7 1966.

Ueda et al., Applied Micro, vol. 15, pp. 492–6, 1967.

LIONEL M. SHAPIRO, Primary Examiner

UNITED STATES PATENT OFFICE
CERTIFICATE OF CORRECTION

Patent No. 3,795,584　　　　Dated March 5, 1974

Inventor(s) Masakazu MITSUHASHI et al

It is certified that error appears in the above-identified patent and that said Letters Patent are hereby corrected as shown below:

Column 4, in Table 5 at line 50, last column under

"Dextrin" should read

-- 13.4

15.7 --

Signed and sealed this 15th day of October 1974.

(SEAL)
Attest:

McCOY M. GIBSON JR.　　　　　　　　C. MARSHALL DANN
Attesting Officer　　　　　　　　　Commissioner of Patents